2,815,285

METHOD OF MAKING STABLE POURABLE OLEAGINOUS SUSPENSIONS

George W. Holman and Judson H. Sanders, Wyoming, Ohio, assignors to The Procter & Gamble Company, Cincinnati, Ohio, a corporation of Ohio No Drawing. Application October 28, 1955, Serial No. 543,546

8 Claims. (Cl. 99—118)

This invention relates to pourable oleaginous materials. More particularly, it relates to an improved method of making stable suspensions of solid fatty glycerides in liquid glyceride oils, which suspensions are characterized by a fluid consistency over a normal range of room temperatures.

A pumpable suspension containing from 15% to 60% of finely divided, normally solid triglycerides in liquid fatty esters is disclosed in U. S. Patent 2,521,242, issued to Mitchell on September 5, 1950. This patent further discloses a method for making such a suspension in which a mixture of the liquid and solid components is formed at a temperature at which the mixture will be completely liquid. The mixture is then cooled, with agitation, to a temperature at which the normally solid triglycerides crystallize in beta-phase crystalline form. This is accomplished by selecting a crystallization temperature not below nor more than 2° C. above the minimum beta-crystallization temperature of the normally solid triglycerides. Crystallization at temperatures below the minimum beta crystallization temperature is disclosed as undesirable.

Close control is needed in the preparation of such a suspension, and the maintenance of the required narrow temperature range is difficult, particularly since, as disclosed in the patent, the minimum beta crystallization temperature changes and becomes lower as the normally solid triglycerides crystallize.

It is an object of the present invention to provide a novel method of preparing a stable suspension of finely divided solid glycerides in a liquid glyceride vehicle which is more readily controlled than methods heretofore proposed, which can be conducted continuously if desired, and which is applicable to the production of suspensions substantially lower in solids content and therefore more easily pourable than earlier products.

Thus, suspensions prepared by the present process will remain pourable and substantially uniform and stable when exposed to temperatures between 60° and 100° F. They may be used for baking and frying. Owing to their fluidity, they are more convenient to measure and mix with other ingredients than are plastic shortenings used for these purposes. If the glycerides in the suspension comprise several percent of solid monoglycerides or diglycerides of fatty acids, or other suitable emulsifying agents, the suspensions may be used as a liquid shortening to replace "superglycerinated" plastic shortenings in conventional recipes using conventional techniques for preparing the batter for and for baking cakes.

Other objects and advantageous features will be apparent from the following specification and the accompanying drawing in which the single figure is a schematic diagram of one form of apparatus suitable for use in the practice of the invention.

In general, the process of this invention comprises forming a mixture of normally liquid glyceride vehicle and normally solid glycerides, at a temperature sufficiently high to ensure that all of the solid glycerides will be melted and the mixture will be completely liquid. The mixture is then rapidly cooled to a temperature at which the solid glycerides will crystallize, and held at the crystallization temperature until substantially all of the solid glycerides have crystallized. The mixture is thereafter treated so that the solid glycerides are uniformly dispersed in the liquid vehicle and at least about 60% of the solids are in a beta crystalline phase.

The term "normally liquid glyceride vehicle" is intended to define a liquid vehicle containing very few glycerides having melting points higher than 60° F., so that when the final suspension is cooled from 100° to 60° F. the amount of solids will not increase by more than about 20% of the solids content at 100° F.

The liquid vehicle should consist primarily of triglycerides. Suitable liquid triglycerides may be derived from a number of naturally occurring liquid glyceride oils including cottonseed oil, soybean oil, peanut oil, rapeseed oil, sesame seed oil, and sunflower seed oil. Also suitable are liquid oil fractions obtained from palm oil, lard and tallow, as, for example, by graining or directed interesterification, followed by separation of the oil. Oils predominating in glycerides of unsaturated acids may require some hydrogenation to maintain flavor, but care should be taken not to greatly increase the amount of glycerides melting above 60° F. When oils are selected which have a larger amount of solids melting between 60° and 100° F. than are desirable, it may be necessary to separate out these solids. Refined cottonseed oil has proved to be especially suitable as a vehicle. Refined and slightly hydrogenated soybean oil has also proved very satisfactory.

Suitable vehicles may include certain di- or triglycerides in which one or two of the —OH groups of the glycerine are replaced by acetic, propionic, butyric, or caproic radicals, and one or two of the remaining —OH groups of the glycerine are replaced by acyl radicals of higher molecular weight saturated or unsaturated fatty acids having from 12 to 22 carbon atoms. For the purpose of this invention, these glycerides, containing both high and low molecular weight acid radicals, will hereinafter be referred to as low molecular synthetic fats. The low molecular synthetic fats must be substantially liquid at 60° F. In order to resist oxidation and to prevent rancidity it is preferred to select low molecular synthetic fats in which there are a minimum of carbon-to-carbon double bonds in the higher molecular weight fatty acid radicals, and preferably not more than two double bonds in any single acid radical. Normally liquid fatty acids of the oleic acid series, having a single carbon-to-carbon double bond, are ideal for the purpose.

The vehicle may also be composed of mixtures of any of the above-listed oils.

The term "normally solid glycerides" is intended to define glycerides which remain solid at temperatures as high as about 100° F. since it is important, during any lowering of temperature, that very few solids recrystallize in the form of interlacing crystals which would impair the fluidity of the shortening. The melting of solids between 60° and 100° F. may also tend to cause separation of the liquid and solid phases at higher temperatures. The normally solid glycerides should be substantially saturated so as to resist oxidation and prevent rancidity. A preferred class of solid glycerides should have an iodine value not greater than about 12.

The normally solid glycerides must have a stable beta crystalline phase, and must be capable of being converted to this beta phase from an alpha or beta-prime phase. A description of the nomenclature and determination of alpha, beta-prime, and beta phases, as well as the method of determining the beta-forming characteristics of fatty materials, is set forth in the aforementioned U. S. Patent 2,521,242, issued September 5, 1950, to P. J. Mitchell, Jr. For the purposes of this invention alpha-phase crystals may be identified by an X-ray diffraction pattern of a single strong short spacing at 4.15 A. The beta-prime crystals may be similarly identified by short spacings at 4.2 A. and 3.8 A. The beta-phase crystals have a short spacing at 4.6 A.

In the pourable suspensions made by the process of this invention it has been found that for good physical properties and reasonable stability of dispersion, at least about 60% of the normally solid glycerides should be in the form of beta-phase crystals. For uniformity and stability over temperatures ranging from 60° to 100° F., especially for a household shortening sold through retail channels, it is preferred that at least 85% of the solids be in a beta-crystalline phase.

If the suspension contains less than about 1% of solids, it is likely to be unsable, and the solids will gradually settle out. However, if more than about 20% of solids are present, the suspension will be too viscous to pour well at temperatures as low as 60° F.

The normally solid glycerides consist primarily of triglycerides such as tristearin, tripalmitin, and other normally solid triglycerides having strong beta-forming tendencies, such as palmito distearin for example, or mixtures of such triglycerides. Included also are substantially completely saturated triglyceride fats made by hydrogenating vegetable and animal oils such as cottonseed oil, sunflower seed oil, linseed oil, hazelnut oil, soybean oil, peanut oil, olive oil, corn oil, palm oil, lard, tallow, and mixtures of any of these.

At least a portion of the mixture of suitable liquid vehicle and solid glycerides can be prepared from triglyceride fats and fatty oils by random rearrangement or by directed rearrangement as described in U. S. Patent No. 2,442,531, issued to E. W. Eckey, June 1, 1949, preferably carrying the directed rearrangement as nearly to completion as possible.

The solid glycerides may include mixtures of mono-, di- and triglycerides formed by "superglycerinating" saturated triglycerides by reacting them with excess glycerine. Also, if desired, additional saturated glycerides may be added to such mixtures.

After the initial liquid mixture of normally liquid vehicle and normally solid glycerides has been prepared, the liquid mixture is quickly cooled to a temperature below the melting point of the alpha crystalline form of the glycerides. The method of determining this melting point is described by Lutton in J. A. C. S. 67, 524 (1945). The rapid cooling may be done advantageously by means of a "Votator" type chilling machine such as is described in U. S. patents to Vogt, Nos. Re. 21,406, issued March 19, 1940, and 1,783,864, issued September 15, 1946. In this type of chiller, liquid is passed into an externally refrigerated cylinder. Any crystals which form are continously scraped from the cylinder walls. Other types of heat exchangers may be also used for this chilling.

The cooling step must take place rapidly so that the crystals will not grow large enough to interlace or aggregate to form a plastic or unduly viscous mass. If the crystals are too large, gravity separation may cause them to settle to the bottom of the oil. However, the crystals should not be so small that the fluid will be unduly viscous. The mixture should be cooled to the crystallization temperature in not more than about 3 minutes. Preferably, as when using a "Votator" chiller this cooling may be done in as short a time as 20 seconds. A satisfactory crystallization temperature range is from 50° to 70° F.

A small part of the solids may crystallize during the chilling step, but the very rapid cooling will cause a large proportion of the mixture to be "supercooled." It is therefore advisable to hold the mixture at the crystallization temperature until substantially all of the normally solid glycerides have crystallized. The heat of fusion of the crystals may cause the temperature to rise.

Mild agitation of the mixture during crystallization is beneficial. This may be advantageously done by passing the mixture through a "picker" box, a container in which material passes between moving and fixed blades.

It may be desirable to facilitate formation of beta-phase crystals during the initial cooling step by "seeding" with nuclei of beta-phase crystals which are added to the initial liquid mixture. Prior to the addition of these beta-crystals the liquid mixture must be cooled to a temperature sufficiently low that the added crystals will not melt. However, these crystals must be added prior to any crystallization of solids from the mixture.

The rapid cooling step will result in the formation of a part of the solids as alpha- or beta-prime-phase crystals. The alpha- and beta-prime-phase crystals are highly undesirable since they are needlelike in shape and tend to interlock and thereby stiffen the final product. The alpha-phase crystals are very soluble in the liquid vehicle, tending to dissolve and recrystallize with temperature changes, with the result that the final product will contain large crystals and will tend to separate into liquid and solid components at high temperatures and to solidify when exposed to low temperatures. The presence of beta-prime phase crystals tends to cause the mixture to become plastic. Since the beta-crystalline phase is the most stable crystalline phase of the solid glycerides, and also the phase which promotes fluidity in the suspension, the mixture must be subjected to some treatment whereby a substantial amount of the less desirable non-beta crystals are changed to beta-phase crystals.

The transformation of the alpha- and beta-prime phase crystals to the beta phase may be accomplished by a step hereinafter referred to as "tempering." At the conclusion of the initial chilling and crystallizing steps, when substantially all of the solid glycerides have crystallized, the mixture is heated to a temperature sufficiently high to melt or dissolve the alpha- or beta-prime phase crystals or to transform these less desirable crystals to a beta phase. However, it must not be so high that a substantial proportion of the beta-phase crystals melt or dissolve, since they may recrystallize as alpha- or beta-prime crystals or as beta-phase crystals too large in size. The optimum temperature will vary with the type and amount of solid glycerides. In general, higher temperatures are required for mixtures containing larger amounts of solids. The use of a higher temperature will create larger crystals. When the mixture contains only a small proportion of solid glycerides, very large crystals will settle out. In such a case a lower tempering temperature is desirable. A suitable temperature range is from 90° to 120° F.

In the tempering step, it is necessary that the mixture be maintained at the proper temperature until the desired change in the crystals has been accomplished. The optimum time for tempering varies with the type and amount of solid glycerides, and the temperature at which the tempering is done. In general, less time for tempering is required at higher temperatures than at lower temperatures since there is a faster transformation of the crystals. In order to further limit the growth of crystals it may be desirable to agitate the mixture during a part or all of the tempering step. The optimum time may be shorter if there is agitation. A preferred range of tempering time is from about 30 minutes to about 3 hours. The mixture may be agitated after the tempering step.

After the tempering step has been completed it may be desirable to cool the mixture. The cooling will change the temperature of the product so that it will be suitable for packaging. Cooling the product to a temperature of from 90° to 95° F. will be very satisfactory for this purpose.

Where a high temperature has been used in the tempering step, or where the solids content of the product is high, it may be desirable to chill the product rapidly to a temperature of from about 50° to 60° F. This rapid cooling will serve to crystallize substantially all of the solid glycerides which may have melted during the tempering step. This is necessary because subsequent precipitation during storage at rest may result in intercrystalline bridging and stiffening. This rapid chilling tends to supercool the mixture, and it may be desirable to mildly agitate the mixture without external heating or cooling until substantially all of the solids have crystallized.

A schematic diagram of one form of apparatus suitable for continuous production of a suspension by the process of this invention is shown in the drawing. The liquid and solid glycerides are melted together in a heated surge tank 11, and mixed with agitator 12. From surge tank 11, the melted mixture is moved by pump 13 through lines 14 and 15 to a scraped-wall chiller 16, where the mixture is rapidly cooled to the crystallization temperature. From the chiller the mixture passes through line 17 into picker box 18. It then moves through line 19 into heat exchanger 20 where it is heated to the tempering temperature. The mixture then flows through line 21 into tempering tank 22, equipped with suitable agitating means 23. Pump 24 then forces the mixture by means of lines 25 and 26 through heat exchanger 27, where the temperature is adjusted to the correct packaging temperature, if necessary, and by means of line 28 to suitable packaging apparatus not shown.

It will be appreciated that the apparatus and the operation thereof here described are illustrative only and may be varied widely without departing from the basic inventive concept.

The following examples will serve to illustrate the invention with greater particularity.

*Example I*

(a) A mixture of refined and bleached peanut oil and 15.5% refined soybean oil hydrogenated to an iodine value of about 8 were heated together to 135° F. This mixture was cooled to 49° F. in less than 1 minute, in a scraped-wall chiller. It was then passed through a picker box in which the temperature rose to about 60° F. A part of the mixture was packaged and stored for one day at a temperature of 90° F. The resulting product was a plastic solid over a temperature range of from 60° F. to 100° F.

(b) The remainder of the mixture from (a) was passed through a heat exchanger which raised the temperature to 117° F. It was then tempered, with mild agitation, for one-half hour while the temperature was maintained between 103° and 109° F. A part of the mixture was packaged. This portion was a stable and pourable suspension at temperatures between 60° and 100° F.

(c) The remainder of the mixture from (b) was passed through a scraped-wall chiller in which it was cooled to 52° F. It was then packaged. This product was a stable fluid suspension over a temperature range of 60° to 100° F.

*Example II*

Suspensions were prepared in a manner similar to steps (a) and (c) of Example I except that they contained 18% soybean oil hydrogenated to an iodine value of about 8. The product packed as in step (a) became plastic, while that packed as in step (c) remained a stable fluid.

*Example III*

A stable suspension was prepared from a mixture containing refined and bleached peanut oil and 15% peanut oil hydrogenated to an iodine value of about 8. The initially melted mixture was chilled to 65° F. in about 20 seconds. The mixture was picked for about 1.5 minutes, heated to 120° F., and tempered for 30 minutes at about 110° F. It was then cooled to about 50° F., picked for 3 minutes, and packaged. After 3 days storage the suspension was still fluid and stable between 60° and 100° F.

*Example IV*

A stable suspension was prepared from a mixture containing refined and bleached peanut oil and 20% peanut oil hydrogenated to an iodine value of about 8. The processing was the same as that of Example III. After 3 days the suspension was still fluid and stable between 60° and 100° F.

*Example V*

A mixture of the same composition as Example IV was melted, chilled to 65° F., and picked for 1.5 minutes. It was then heated to 100° F. and tempered between 96° and 104° F. for 30 minutes. The tempered mixture was chilled to about 50° F. and packaged. After 2 weeks this suspension was still fluid and stable between 60° and 100° F.

*Example VI*

A mixture containing refined and bleached soybean oil, hydrogenated to an iodine value of about 97, and 17% peanut oil, hydrogenated to an iodine value of about 8, was melted, chilled to 70° F., heated to 110° F., and tempered at 110° F. for 30 minutes. The tempered mixture was chilled to 50° F. and packaged. The suspension was stable and pourable down to 60° F.

*Example VII*

A stable suspension was prepared from a mixture containing refined and bleached soybean oil, hydrogenated to an iodine value of about 100, and 15% peanut oil, hydrogenated to an iodine value of about 8. The mixture was melted, chilled to 61° F., and then heated to about 133°. The mixture was then tempered for about ¾ hour, chilled to 45° F. and packaged at about 67° F. This suspension was stable and fluid from 60° to 100° F.

*Example VIII*

A pourable suspension was prepared composed of refined, winterized, bleached and deodorized cottonseed oil in which was suspended 2% soybean oil hydrogenated to an iodine value of about 8. The cottonseed and soybean oils were first melted together and mixed. The mixture was then cooled to a temperature of 67° F. and picked for 15 minutes at a temperature of 70° F. The temperature was then raised to 90° F. by use of a heat exchanger, and the product was tempered for 3 hours at about 90° F., agitating the mixture during tempering.

The resulting suspension remained fluid over a temperature range of 60° to 100° F. for a period of more than 2 months. After one months storage in a container at temperatures ranging from 80° to 100° F. the height of clear oil which had separated did not exceed 5 to 8% of the total height of the suspension in the container.

*Example IX*

A pourable suspension was prepared from refined, winterized, bleached and deodorized cottonseed oil containing 6% soybean oil hydrogenated to an iodine value of about 8. The initial components were melted and mixed together, and the mixture was rapidly chilled to a temperature of about 67° F. The mixture was picked for 15 minutes at 75° F., and heated to a temperature of 95° F. The mixture was then held at this temperature with agitation for 3 hours. The resulting suspension was very fluid over a temperature range of 60° to 100° F. when held for a period of over 2 months. After one month storage at temperatures ranging from 80° to 100° F. the oil separation of the product did not exceed 1%.

What is claimed is:

1. The method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle at a temperature sufficiently high to melt all of said solid glycerides, cooling said mixture to a temperature below the alpha melting temperature of said solid glycerides in not more than 3 minutes, and tempering said mixture to convert non-beta crystals to a beta phase to such an extent that at least 60% of the solid glycerides are in a beta phase.

2. The method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle at a temperature sufficiently high to melt all of said solid glycerides, cooling said mixture to a temperature below the alpha melting temperature of said solid glycerides in not more than 3 minutes, holding the mixture at the crystallization temperature until substantially all of said solid glycerides have crystallized, and tempering the mixture to convert non-beta crystals to a beta phase to such an extent that at least 60% of said solid glycerides are in a beta phase.

3. The method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle at a temperature sufficiently high to melt all of said solid glycerides, cooling said mixture to a temperature below the alpha melting temperature of said solid glycerides in not more than 3 minutes, mildly agitating the mixture until substantially all of said solid glycerides have crystallized, and tempering said mixture to convert non-beta crystals to a beta phase to such an extent that at least 60% of said solid glycerides are in a beta phase.

4. The method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle at a temperature sufficiently high to melt all of said solid glycerides, cooling said mixture to a crystallization temperature of from 50° to 70° F. in not more than 3 minutes, holding said mixture at said crystallization temperature until substantially all of said solid glycerides have crystallized, and tempering said mixture to convert non-beta crystals to a beta phase to such an extent that at least 60% of said solid glycerides are in a beta phase.

5. The method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle at a temperature sufficiently high to melt all of said solid glycerides, cooling said mixture to a temperature of from 50° to 70° F. in not more than 3 minutes, mildly agitating said mixture until substantially all of said solid glycerides have crystallized, and tempering said mixture to convert non-beta crystals to a beta phase to such an extent that at least 60% of said solid glycerides are in a beta phase.

6. The method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle at a temperature sufficiently high to melt all of said solid glycerides, cooling said mixture to a crystallization temperature below the alpha melting temperature of said solid glycerides in not more than 3 minutes, holding the mixture at said crystallization temperature until substantially all of said solid glycerides have crystallized, heating said mixture to a tempering temperature of from 90° to 120° F. and maintaining said mixture at said tempering temperature until at least 60% of said solid glycerides are in a beta phase.

7. The method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle at a temperature sufficiently high to melt all of said solid glycerides, cooling said mixture to a crystallization temperature below the alpha melting temperature of said solid glycerides in not more than 3 minutes, holding the mixture at said crystallization temperature until substantially all of said solid glycerides have crystallized, heating said mixture to a tempering temperature of from 90° to 120° F., and maintaining said mixture at said tempering temperature for from 30 minutes to about 3 hours.

8. A continuous method of making a pourable oleaginous suspension of finely divided, normally solid glycerides in a normally liquid glyceride vehicle, said solid glycerides being capable of existing in a stable beta crystalline phase and comprising from about 1% to about 20%, by weight, of said suspension, comprising the steps of forming a mixture of said solid glycerides and said liquid glyceride vehicle, heating said mixture to a temperature sufficiently high to melt all of said solid glycerides, rapidly cooling said mixture to a temperature of from 50° to 70° F. in not more than 3 minutes, agitating said mixture until substantially all of said solid glycerides have crystallized, heating said mixture to a tempering temperature of from 90° to 120° F., agitating said mixture at said tempering temperature until at least 60% of said solid glycerides are in a beta crystalline form, cooling said mixture to a temperature of from 90° to 95° F., and packaging said mixture.

References Cited in the file of this patent

UNITED STATES PATENTS

| | | |
|---|---|---|
| 2,521,219 | Holman et al. | Sept. 5, 1950 |
| 2,521,242 | Mitchell | Sept. 5, 1950 |
| 2,521,243 | Mitchell | Sept. 5, 1950 |
| 2,721,803 | Ginn | Oct. 25, 1955 |